(12) United States Patent
Chen

(10) Patent No.: US 12,337,585 B2
(45) Date of Patent: Jun. 24, 2025

(54) DECORATIVE FILM, LIGHT-EMITTING MODULE, AND ELECTRONIC DEVICE

(71) Applicant: Nothing Technology Limited, London (GB)

(72) Inventor: Lei Chen, Shenzhen City (GB)

(73) Assignee: Nothing Technology Limited, London (GB)

( * ) Notice: Subject to any disclaimer, the term of this patent is extended or adjusted under 35 U.S.C. 154(b) by 6 days.

(21) Appl. No.: 18/345,846

(22) Filed: Jun. 30, 2023

(65) Prior Publication Data

US 2024/0004267 A1  Jan. 4, 2024

(30) Foreign Application Priority Data

Jul. 4, 2022  (CN) .......................... 202210781101.1

(51) Int. Cl.
*B32B 7/12* (2006.01)
*B32B 3/08* (2006.01)

(52) U.S. Cl.
CPC ............... *B32B 7/12* (2013.01); *B32B 3/085* (2013.01)

(58) Field of Classification Search
CPC .................................. B32B 7/12; B32B 3/085
USPC ....................................................... 428/195.1
See application file for complete search history.

(56) References Cited

U.S. PATENT DOCUMENTS

2021/0080785 A1  3/2021  Yang
2024/0004267 A1*  1/2024  Chen .................... G02B 5/0242

FOREIGN PATENT DOCUMENTS

| CN | 105114842 A | 12/2015 |
|---|---|---|
| CN | 105114842 | 5/2018 |
| EP | 3587103 B1 | 12/2020 |
| WO | 2019092582 A1 | 5/2019 |
| WO | 2021187301 A1 | 9/2021 |

OTHER PUBLICATIONS

European Search Report from Application No. 23183042.3 dated Dec. 11, 2023.

* cited by examiner

*Primary Examiner* — Betelhem Shewareged
(74) *Attorney, Agent, or Firm* — Calfee, Halter & Griswold LLP

(57) ABSTRACT

A decorative film includes a film body and a decorative layer. The film body is made of a transparent or semi-transparent material. The decorative layer is disposed at the film body and includes a texture layer and/or a semi-transparent colored ink layer, where the texture layer is transparent or semi-transparent. When the light-emitting element emits no light, the texture layer enables the decorative film to present at least one of a pattern effect, a dazzle effect, a matt effect, or a color-change effect, and the semi-transparent colored ink layer enables the decorative film to present the same color as the semi-transparent colored ink layer. When the decorative film is applicable to the light-emitting module, the decorative film covers the light-emitting surface of the light-emitting element, which can not only protect the light-emitting element, but also decorate the light-emitting module in a non-light-emitting state.

13 Claims, 3 Drawing Sheets

DECORATIVE FILM, LIGHT-EMITTING MODULE, AND ELECTRONIC DEVICE

CROSS-REFERENCE TO RELATED APPLICATION

The present disclosure claims priority to Chinese Patent Application 202210781101.1, filed on Jul. 4, 2022, and entitled "DECORATIVE FILM, LIGHT-EMITTING MODULE, AND ELECTRONIC DEVICE", which is incorporated herein by reference in its entirety.

TECHNICAL FIELD

This disclosure relates to the technical field of decorative assemblies, and more particularly, to a decorative film, a light-emitting module, and an electronic device.

BACKGROUND

Currently, a light-emitting module of an electronic device such as a mobile phone or a tablet generally consists of a light-emitting diode (LED) lamp strip and a film. The film is molded together with the LED lamp strip by printing ink with a bonding force. However, the film of the existing light-emitting module lacks decorative effect, causing poor visual experience.

SUMMARY

In a first aspect of the present subject matter, a decorative film is provided in the disclosure. The decorative film is used to cover a light-emitting surface of a light-emitting element and includes a film body and a decorative layer. The film body is made of a transparent or semi-transparent material. The decorative layer is disposed at the film body and includes a texture layer and/or a semi-transparent colored ink layer, where the texture layer is transparent or semi-transparent. When the light-emitting element emits no light, the texture layer enables the decorative film to present at least one of a pattern effect, a dazzle effect, a matt effect, or a color-change effect, and the semi-transparent colored ink layer enables the decorative film to present the same color as the semi-transparent colored ink layer.

In a second aspect, a light-emitting module is provided in the disclosure. The light-emitting module includes a light-emitting element and the decorative film of any one of the above embodiments. The decorative film covers a light-emitting surface of the light-emitting element.

In a third aspect, an electronic device is provided in the disclosure. The electronic device includes a housing and the light-emitting module of any one of the above embodiments. The housing includes a transparent region. The light-emitting module is disposed inside the housing and visually displayed on the housing through the transparent region.

BRIEF DESCRIPTION OF THE DRAWINGS

To describe technical solutions in embodiments of the disclosure more clearly, the following will give a brief introduction to accompanying drawings required for describing embodiments. Apparently, the accompanying drawings hereinafter described merely illustrate some embodiments of the disclosure. Based on these drawings, those of ordinary skills in the art can also obtain other drawings without creative effort.

Figure 1:
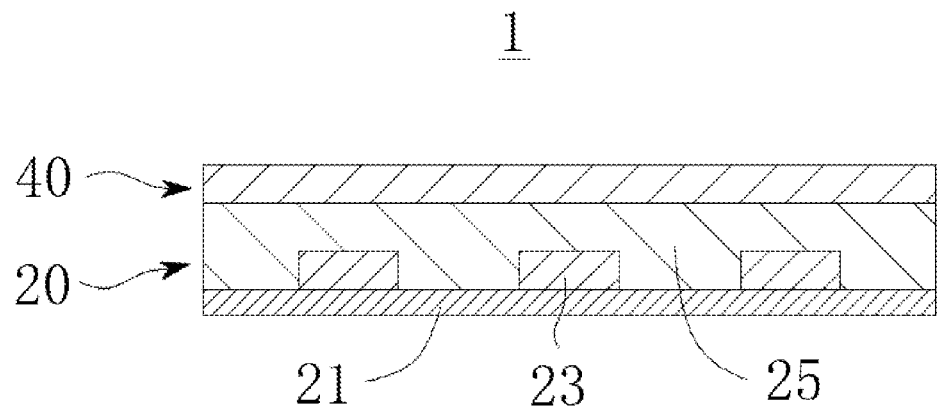
FIG. 1 is a schematic structural view of a light-emitting module provided in an embodiment of the disclosure.

Illustration of main component symbols:

light-emitting module 1, light-emitting element 20, circuit board 21, light-emitting chip 23, light-conversion medium layer 25, decorative film 40, film body 41, texture layer 43, first texture layer 431, second texture layer 432, microstructure 4321, brightness-enhancement film 4323, ink layer 45, first light diffusing ink layer 451, second light diffusing ink layer 452, semi-transparent colored ink layer 453, adhesive layer 47, electronic device 2, housing 60, transparent region 61, camera module 81, wireless charging module 82.

The disclosure will be further illustrated in combination with the following specific embodiments and the accompanying drawings.

DETAILED DESCRIPTION

The following will describe embodiments of the disclosure in detail, and examples of embodiments herein will be illustrated in accompanying drawings, and the same or similar reference numerals denote the same or similar components or components having the same or similar functions throughout the context. Embodiments described hereinafter with reference to the accompanying drawings are illustrative and intended for explaining, rather than limiting, the disclosure.

The disclosure aims to solve at least one of technical problems in the related art. To this end, a decorative film, a light-emitting module, and an electronic device are provided in the disclosure. The decorative film is used to cover a light-emitting surface of a light-emitting element, which can not only protect the light-emitting element, but also decorate the light-emitting element, thereby providing users with good visual experience.

Compared with the related art, beneficial effects of the disclosure are the following. The decorative layer is disposed at the film body of the decorative film and includes the semi-transparent colored ink layer and/or the transparent or semi-transparent texture layer, and thus when the light-emitting element emits no light, the texture layer can enable the decorative film to present at least one appearance effect, and the semi-transparent colored ink layer can enable the decorative film to present the same color as the semi-transparent colored ink layer, thereby improving a sense of beauty of an appearance of the decorative film and providing good visual experience for users. Moreover, when the decorative film is applied to the light-emitting module, the decorative film covers the light-emitting surface of the light-emitting element, which can not only protect the light-emitting element, but also decorate the light-emitting module in a non-light-emitting state.

Part of additional aspects and advantages of the disclosure will be given in the following, and another part of additional aspects and advantages of the disclosure may become apparent from the following or be learned from the practice of the disclosure.

Referring to FIG. 1, a light-emitting module 1 is provided in the disclosure. The light-emitting module 1 includes a light-emitting element 20 and a decorative film 40. The decorative film 40 covers a light-emitting surface of the light-emitting element 20. As illustrated in FIG. 1, in an embodiment of the disclosure, the light-emitting element 20 may include a circuit board 21, multiple light-emitting chips 23 arranged on the circuit board 21, and a light-conversion medium layer 25 covering the multiple light-emitting chips 23. A side surface of the light-conversion medium layer 25 away from the circuit board 21 is the light-emitting surface of the light-emitting element 20. It can be understood that, the circuit board 21 can drive each light-emitting chip 23 to emit light or emit no light, and can drive all or part of the light-emitting chips 23 to emit light according to requirements.

In some embodiments of the disclosure, the circuit board 21 may be a printed circuit board or a flexible circuit board, preferably the flexible circuit board. The light-emitting module 1 manufactured by using the flexible circuit board as a carrier can be bent and folded according to requirements, is applicable in various situations, and has an improved applicability.

In some embodiments of the disclosure, each light-emitting chip 23 may be a light-emitting diode (LED), a mini-LED, or a micro-LED, and the multiple light-emitting chips 23 may include at least one of an LED, a mini-LED, or a micro-LED. In some embodiments illustrated in FIG. 1, the multiple light-emitting chips 23 are small-sized mini-LEDs. In this way, an overall thickness (namely, a size of the light-emitting element 20 in a direction perpendicular to the circuit board 21) of the light-emitting element 20 can be reduced, thereby thinning the light-emitting module 1. Moreover, the multiple light-emitting chips 23 are the same light-emitting element, and thus a design difficulty of a drive circuit of the circuit board 21 can be reduced.

In some embodiments of the disclosure, a material of the light-conversion medium layer 25 may include fluorescent adhesive or quantum dot (QD) adhesive. The light-conversion medium layer 25 is used to convert three-primary-color light (blue light, red light, or green light) emitted by the light-emitting chip 23 into light in other colors, usually white light, where a specific conversion principle of the light-conversion medium layer 25 is the same as a conversion principle of the existing fluorescent adhesive layer or QD adhesive layer, which will not be described in detail herein.

It needs to be significantly noted that in some embodiments of the disclosure, the decorative film 40 covers the light-emitting surface of the light-emitting element 20, which can not only protect the light-emitting element 20, but also allow light emitted by the light-emitting element 20 to pass through when the light-emitting element 20 emits light, and can decorate the light-emitting element 20 when the light-emitting element 20 emits no light.

Figure 2:
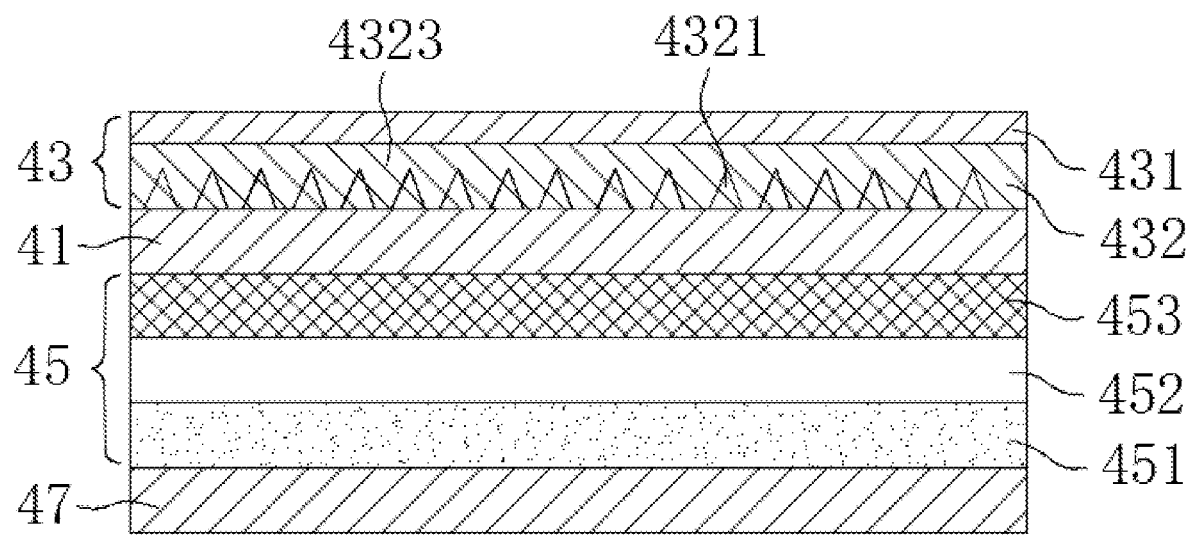
FIG. 2 is a schematic structural view of a decorative film illustrated in FIG. 1.

Specifically, referring to FIGS. 1 and 2, in an embodiment of the disclosure, the decorative film 40 includes a film body 41 and a decorative layer. The film body 41 is made of a transparent or semi-transparent material. The decorative layer is disposed on a side surface of the film body 41 away from the light-emitting element 20, and the decorative layer is light-transmissive to allow light emitted by the light-emitting element 20 to pass through.

A material of the film body 41 includes, but is not limited to, glass, polymethyl methacrylate (PMMA), polyethylene terephthalate (PET), etc., which is not limited herein.

The decorative layer includes a texture layer 43 and/or a semi-transparent colored ink layer 453, where the texture layer 43 is transparent or semi-transparent. When the light-emitting element 20 emits no light, the texture layer 43 can present an appearance effect under irradiation of external light, where the appearance effect is not limited to at least one of a pattern effect, a dazzle effect, a matt effect, or a color-change effect, and thus the decorative film 40 can present at least one appearance effect. When the light-emitting element 20 emits no light, the semi-transparent colored ink layer 453 can enable the decorative film 40 to present the same color as the semi-transparent colored ink layer 453.

It can be understood that the decorative layer is disposed at the film body 41 of the decorative film 40 and includes the semi-transparent colored ink layer 453 and/or the transparent or semi-transparent texture layer 43, and thus when the light-emitting element 20 emits no light, the decorative layer can enable the decorative film 40 to present various colors and/or at least one appearance effect, thereby improving a sense of beauty of an appearance of the decorative film 40 and providing good visual experience for users. Moreover, when the decorative film 40 is applied to the light-emitting module 1, the decorative film 40 covers the light-emitting surface of the light-emitting element 20, which can not only protect the light-emitting element 20, but also decorate the light-emitting module 1 in a non-light-emitting state.

Preferably, as illustrated in FIG. 2, in an embodiment of the disclosure, the decorative layer of the decorative film 40 may include the texture layer 43 disposed on the side surface of the film body 41 away from the light-emitting element 20. The texture layer 43 may include a first texture layer 431 and a second texture layer 432. The first texture layer 431 is used to present a first appearance effect, the second texture layer 432 is used to present a second appearance effect, and the first appearance effect is different from the second appearance effect. In the embodiment, different texture layers are disposed on the film body 41, such that the decorative film 40 can present a combination of different appearance effects when the light-emitting element 20 emits no light, thereby further improving the sense of beauty of the appearance of the decorative film 40.

Specifically, as illustrated in FIG. 2, in an embodiment of the disclosure, the second texture layer 432 may include multiple microstructures 4321 disposed on the side surface of the film body 41 away from the light-emitting element 20, and a brightness-enhancement film 4323 covering the multiple microstructures 4321. Each microstructure 4321 has at least one reflective surface, and the reflective surface and the film body 41 define an included angle greater than 90°. The second texture layer 432 is used to present the dazzle effect. The first texture layer 431 is disposed on the brightness-enhancement film 4323. The first texture layer 431 may include at least one of a linear texture, a coil texture, or a wave texture, where the stripe textures may be arranged according to a preset pattern, such that the first texture layer 431 can be used to present the pattern effect.

In the embodiment, the second texture layer 432 and the first texture layer 431 are formed sequentially on the film body 41 of the decoration film 40. When the light-emitting element 20 emits no light and there is other light irradiating the decorative film 40, a texture pattern of the first texture layer 431 can be clearly presented, and thus a preset pattern corresponding to the texture of the first texture layer 431 can be viewed by the user, thereby improving a sense of beauty of the decorative film 40. Moreover, the light may pass through the transparent or semi-transparent first texture layer 431 to further irradiate the second texture layer 432. Since the second texture layer 432 may include the multiple microstructures 4321 having reflective surfaces, the light irradiating the decorative film 40 may be reflected at multiple angles, and thus light brightness of the decorative film 40 can be improved in combination with the effect of the brightness-enhancement film 4323. Therefore, the dazzle effect can be presented, a visual dead angle of the decorative film 40 can be reduced, and the light brightness of the decorative film 40 can be improved. In addition, there is a certain optical path difference between reflected light of the first texture layer 431 and reflected light of the second texture layer 432, and thus brightness of reflected light of different texture layers is different, thereby increasing contrast between different texture layers of the decorative film 40, so that appearance effects of different texture layers are superposed, the layers are clearer, and a spatial stereoscopic effect is stronger.

It needs to be noted that, the brightness-enhancement film 4323 of the second texture layer 432 may be formed with coating process. The brightness-enhancement film 4323 covers the multiple microstructures 4321, which can not only improve brightness of reflected light of the multiple microstructures 4321, but also further improve the light brightness of the decorative film 40. Moreover, the brightness-enhancement film 4323 covers the multiple microstructures 4321, and thus flatness of the second texture layer 432 can be improved, which is more beneficial to forming the first texture layer 431 on the flattened second texture layer 432. It needs to be further noted that, the first texture layer 431 and the second texture layer 432 each may be prepared by using any existing texture forming process including, but not limited to, printing, pad printing, computer numerical control (CNC), and the like. In embodiments of the disclosure, the first texture layer 431 and the second texture layer 432 may be formed by printing an ultraviolet (UV) texture adhesive. A texture layer with a certain thickness can be formed by adjusting a thickness of the UV texture adhesive printed and controlling the printing process, thereby obtaining a better texture effect.

In one of the embodiments, as illustrated in FIG. 2, each microstructure 4321 of the second texture layer 432 may be, but is not limited to, a pyramid structure or a frustum structure. Specifically, in the embodiment illustrated in FIG. 2, the multiple microstructures 4321 are multiple quadrangular pyramid structures arranged in an array, and each microstructure 4321 has four reflective surfaces (namely, side surfaces of the quadrangular pyramid). The multiple microstructures 4321 may also be multiple pyramid structures arranged in an array such as multiple triangular pyramid structures, multiple pentagonal pyramid structures, or other pyramid structures having multiple reflective surfaces, which is not limited herein. In the embodiment illustrated in FIG. 2, each microstructure 4321 of the second texture layer 432 has multiple reflective surfaces, and thus multi-angle light reflection can be achieved, thereby realizing that light reflected by the decorative film 40 can be received by a user in a wide range, and improving light brightness and flatness of the decorative film 40. In other embodiments, the multiple microstructures 4321 may be multiple frustum structures arranged in an array, and each microstructure 4321 includes a ring-shaped reflective surface (namely, a ring-shaped tapered surface of the frustum structure), and thus multi-angle light reflection can be realized, thereby improving the light brightness and flatness of the decorative film 40, which will not be repeated herein.

It can be understood that, in the embodiments of the disclosure, there is an included angle greater than 90° between a reflective surface of each microstructure 4321 and the film body 41. If the included angle is too small, i.e., an inclination of the reflective surface relative to the film body 41 is too large, light reflected by the reflective surface can only be received by the user from a side-viewing direction, thereby reducing surface flatness of the decorative film 40 in appearance. On the contrary, if the included angle is too large, i.e., the inclination of the reflective surface relative to the film body 41 is too small, the light reflected by the reflective surface can only be received by the user from a front-viewing direction or from a direction proximate to the front-viewing direction, but the decorative film 40 is often viewed by the user from the side-viewing direction, which reduces the light brightness of the decorative film 40. Therefore, the included angle between the reflective surface of each microstructure 4321 and the film body 41 may be reasonably designed, preferably range from 120° to 160°.

Furthermore, in an embodiment illustrated in FIG. 2, the decorative layer of the decorative film 40 may further include the semi-transparent colored ink layer 453 disposed on at least one side surface of the film body 41 in a thickness direction of the film body 41. The semi-transparent colored ink layer 453 is disposed at a side of the texture layer 43 close to the light-emitting element 20. Specifically, in the embodiment illustrated in FIG. 2, the decorative layer includes the semi-transparent colored ink layer 453 disposed on the side surface of the film body 41 close to the light-emitting element 20.

It is easy to understand that, the semi-transparent colored ink layer 453 is disposed at the side of the texture layer 43 close to the light-emitting element 20, such that blocking of the texture layer 43 by the semi-transparent colored ink layer 453 can be avoided, thereby avoiding weakening of an appearance effect presented by the texture layer 43. Moreover, under the reflection of the semi-transparent colored ink layer 453, the dazzle effect presented by the second texture layer 432 can enable at least part of the decorative film 40 to present various colors. Furthermore, part of the decorative film 40 where various colors are presented and colors may change according to a change of a viewing direction of a user.

Further, in an embodiment illustrated in FIG. 2, the decorative layer of the decorative film 40 may further include a light diffusing ink layer disposed on the at least one side surface of the film body 41 in the thickness direction of the film body 41. The light diffusing ink layer is disposed on the decorative film 40, so that when the light-emitting element 20 emits light, light passing through the light diffusing ink layer can be evenly dispersed, thereby improving light-emitting uniformity of the light-emitting module 1.

In the same way, the light diffusing ink layer is disposed at the side of the texture layer 43 close to the light-emitting element 20, such that blocking of the texture layer 43 by the light diffusing ink layer can be avoided, thereby avoiding weakening of the appearance effect presented by the texture layer 43. To reduce the difficulty of the process for forming the semi-transparent colored ink layer 453 and the light diffusing ink layer, the light diffusing ink layer is preferably disposed at the side of the film body 41 close to the light-emitting element 20, and arranged adjacent to the semi-transparent colored ink layer 453.

In some embodiments of the disclosure, the light diffusing ink layer may be implemented as one or multiple layers. Compared with arrangement of a single light diffusing ink layer, arrangement of multiple light diffusing ink layers can further improve the light-emitting uniformity of the light-emitting module 1.

In the embodiment illustrated in FIG. 2, the light diffusing ink layer may include a first light diffusing ink layer 451 and a second light diffusing ink layer 452. The first light diffusing ink layer 451, the second light diffusing ink layer 452, and the semi-transparent colored ink layer 453 form an ink layer 45 of the decorative layer.

The semi-transparent colored ink layer 453 may be formed by printing an existing semi-transparent colored ink, etc. Similarly, any one light diffusing ink layer may be formed by printing the existing light diffusing ink (usually white ink), etc., which will not be described in detail herein.

Figure 3:
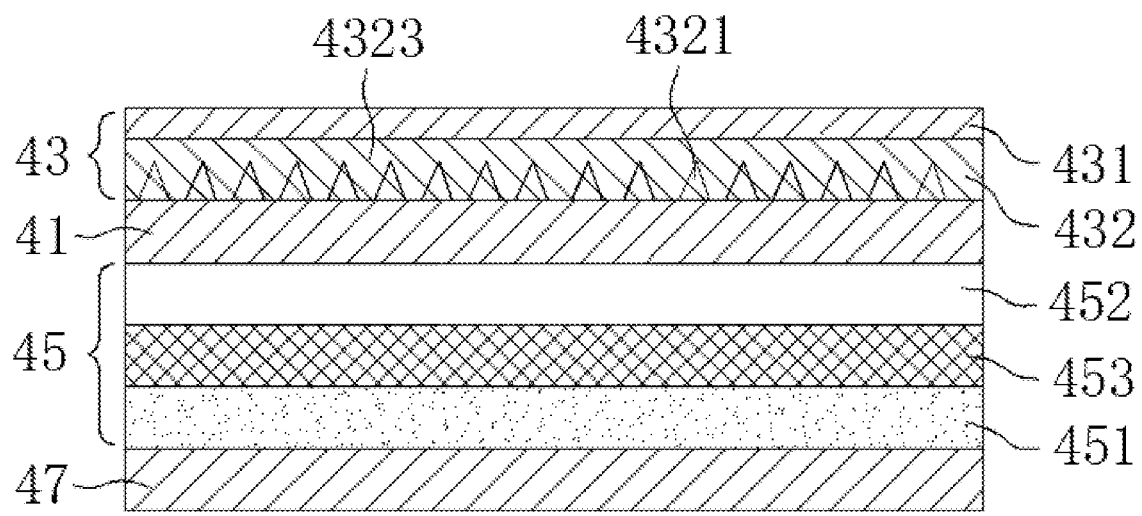
FIG. 3 is a schematic structural view of a decorative film illustrated in FIG. 1.
Figure 4:
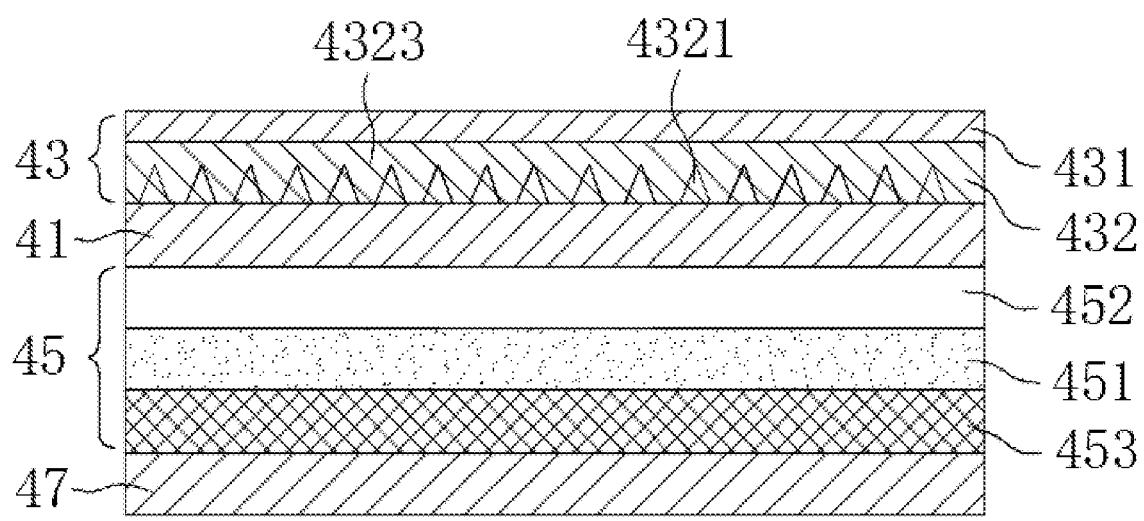
FIG. 4 is a schematic structural view of a decorative film illustrated in FIG. 1.

As illustrated in FIG. 2, in a possible embodiment, the first light diffusing ink layer 451 and the second light diffusing ink layer 452 are stacked on each other and disposed at a side of the semi-transparent colored ink layer 453 away from the film body 41. As illustrated in FIG. 3, in another possible embodiment, the first light diffusing ink layer 451 and the second light diffusing ink layer 452 are disposed at two opposite sides of the semi-transparent colored ink layer 453 in the thickness direction of the semi-transparent colored ink layer 453, respectively. As illustrated in FIG. 4, in yet another possible embodiment, the first light diffusing ink layer 451 and the second light diffusing ink layer 452 are stacked on each other and disposed between the semi-transparent colored ink layer 453 and the film body 41.

Referring to FIG. 2 again, in an embodiment of the disclosure, the decorative film 40 may further include an adhesive layer 47 that is light-transmissive. The adhesive layer 47 is disposed at a side of the film body 41 and a side of the decorative layer that are close to the light-emitting element 20, and the adhesive layer 47 adheres to the light-emitting surface of the light-emitting element 20. Specifically, in an example of FIG. 2, the adhesive layer 47 is disposed at a side of the ink layer 45 close to the light-emitting element 20.

In some embodiments of the disclosure, a material of the adhesive layer 47 may include printing ink with a high bonding force, and the adhesive layer 47 adheres to the light-emitting surface of the light-emitting element 20 through hot pressing. The material of the adhesive layer 47 includes printing ink with a bonding force and the adhesive layer 47 is arranged adjacent to the ink layer 45, which is beneficial to further reducing the difficulty of the process for ink formation.

In some embodiments, the material of the adhesive layer 47 may include transparent or white optically clear adhesive (OCA), and the adhesive layer 47 adheres to the light-emitting surface of the light-emitting element 20.

Figure 5:
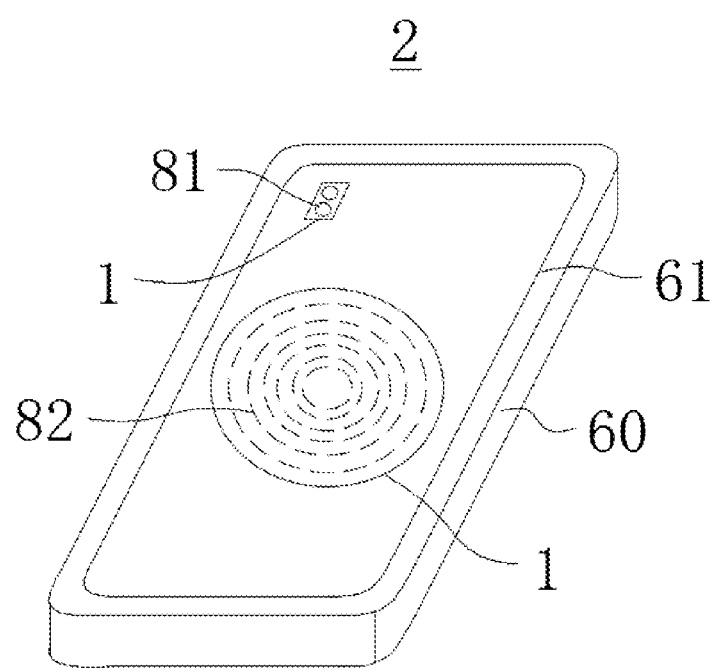
FIG. 5 is a schematic structural view of an electronic device provided in an embodiment of the disclosure.

Furthermore, referring to FIG. 5, an electronic device 2 is further provided in some embodiments of the disclosure. The electronic device 2 may be, but is not limited to, a mobile phone, a tablet, a display, or other electronic devices. Specifically, the electronic device 2 may include a housing 60 and the light-emitting module 1 of any one of the above embodiments. The housing 60 includes a transparent region 61. The light-emitting module 1 is disposed inside the housing 60 and visually displayed on the housing 60 through the transparent region 61.

It needs to be noted that, similar to an existing electronic device, the electronic device 2 may further include a control module, a camera module, a wireless charging module, a memory, a sensor, and other electronic elements, which will not be described in detail herein. The light-emitting element 20 of the light-emitting module 1 may include a circuit board 21 that is electrically connectable with the control module of the electronic device 2. The control module may control the light-emitting chip 23 on the circuit board 21 to emit light or emit no light, so that a charging state, new information, or the like of the electronic device 2 is indicated through the light-emitting chip 23, thereby realizing state interaction between the light-emitting module 1 and the electronic device 2.

As illustrated in FIG. 5, in some embodiments of the disclosure, the housing 60 may include a rear cover opposite to a display screen of the electronic device 2 and a middle frame, where the display screen and the rear cover are fixed through the middle frame. Optionally, the rear cover and the middle frame may be entirely or partially made of a transparent material (not limited to glass, transparent plastic, and the like), and transparent part of the rear cover and transparent part of the middle frame form the transparent region 61. In the embodiments illustrated in FIG. 5, the entire rear cover of the housing 60 is made of a transparent material, that is, the entire rear cover is the transparent region 61. The entire rear cover is made as the transparent region 61, which not only facilitates processing and preparation, but also enables multiple electronic elements such as the camera module 81, the wireless charging module 82, and the like, of the electronic device 2 to be visually displayed on the housing 60 through the transparent rear cover (namely, the transparent region 61). Therefore, various electronic elements and the arrangement of the electronic elements can be viewed through a back surface of the electronic device 2 by the user, and a sense of science and technology and an overall sense of beauty of the electronic device 2 can be improved.

In some embodiments of the disclosure, the light-emitting module 1 is disposed around the electronic element visually displayed on the housing 60. For example, in the embodiments illustrated in FIG. 5, both the camera module 81 and the wireless charging module 82 of the electronic device 2 are visually displayed on the housing 60 through the transparent region 61, one light-emitting module 1 is disposed around the camera module 81, and another light-emitting module 1 is disposed around the wireless charging module 82. In this way, when the camera module 81 is used for photographing, the control module of the electronic device 2 may control the light-emitting module 1 around the camera module 81 to perform light supplementation, thereby improving a photographing effect and avoiding deficiencies such as excessive exposure that is caused by a flash light of the electronic device 2. In the same way, when the wireless charging module 82 is used for charging, the control module of the electronic device 2 may control the light-emitting module 1 around the wireless charging module 82 to prompt the user the current charging progress of the electronic device 2.

In other embodiments, the electronic device 2 may also be provided with multiple light-emitting modules 1 at different positions in the housing 60, so that the multiple light-emitting modules 1 cooperatively form a preset pattern, which will not be described in detail herein.

It can be understood that, in the electronic device 2, the decorative film 40 of the light-emitting module 1 of the electronic device 2 may be the decorative film 40 in any one of the above embodiments, and thus the decorative film 40 can provide at least all beneficial effects provided by the technical solutions in the above embodiments. In other words, the decorative film 40 can decorate the light-emitting element 20 when the light-emitting element 20 emits no light, and can be visually displayed on the housing 60, thereby improving the sense of beauty of the appearance of the electronic device 2. For detailed illustration, reference can be made to the related contents of the decorative film 40 in the above embodiments, which will not be repeated herein.

The reference term "an embodiment" or "specific embodiments" referred to herein means that a particular feature, structure, material, or characteristic described in conjunction with the embodiments may be contained in at least one or embodiment of the disclosure. The exemplary expressions of the above terms appearing in the specification does not necessarily refer to the same embodiment. Furthermore, the particular feature, structure, material, or characteristic described may be properly combined in any one or more embodiments.

Although embodiments of the disclosure have been illustrated and described, it would be appreciated by those skilled in the art that the various changes, modifications, alternatives, and variations can be made to these embodiments without departing from the principles and spirit of the disclosure, and the scope of the disclosure is defined in the claims and equivalents thereof.

What is claimed is:

1. A decorative film, used to cover a light-emitting surface of a light-emitting element and comprising:
    a film body made of a transparent or semi-transparent material; and
    a decorative layer disposed at the film body and comprising a texture layer and/or a semi-transparent colored ink layer, the texture layer being transparent or semi-transparent, wherein
    when the light-emitting element emits no light, the texture layer enables the decorative film to present at least one of a pattern effect, a dazzle effect, a matt effect, or a color-change effect, and the semi-transparent colored ink layer enables the decorative film to present the same color as the semi-transparent colored ink layer,
    wherein the decorative layer comprises the texture layer disposed on a side surface of the film body away from the light-emitting element, wherein the texture layer comprises a first texture layer and a second texture layer, wherein the first texture layer is configured to present a first appearance effect, the second texture layer is configured to present a second appearance effect, and the first appearance effect is different from the second appearance effect,
    wherein the second texture layer comprises a plurality of microstructures disposed on the side surface of the film body away from the light-emitting element, and a brightness-enhancement film covering the plurality of microstructures, wherein each of the microstructures has at least one reflective surface, and the reflective surface and the film body define an included angle greater than 90°, wherein the microstructures comprise pyramid structures arranged in an array or frustum structures arranged in an array, each microstructure providing multi-angle light reflection, and wherein the second texture layer is configured to present the dazzle effect; and
    wherein the first texture layer is disposed on a side surface of the brightness-enhancement film away from the film body, the first texture layer comprises at least one of a linear texture, a coil texture, or a wave texture, and the first texture layer is configured to present the pattern effect.

2. The decorative film of claim 1, wherein the decorative layer comprises the semi-transparent colored ink layer disposed on at least one side surface of the film body in a thickness direction of the film body, and when the decorative layer comprises the texture layer, the semi-transparent colored ink layer is disposed at a side of the texture layer close to the light-emitting element.

3. The decorative film of claim 2, wherein the decorative layer further comprises a light diffusing ink layer disposed on the at least one side surface of the film body in the thickness direction of the film body, and when the decorative layer comprises the texture layer, the light diffusing ink layer is disposed at the side of the texture layer close to the light-emitting element.

4. The decorative film of claim 3, wherein the light diffusing ink layer comprises a first light diffusing ink layer and a second light diffusing ink layer, wherein
    the first light diffusing ink layer and the second light diffusing ink layer are disposed at two opposite sides of the semi-transparent colored ink layer in the thickness direction of the semi-transparent colored ink layer.

5. The decorative film of claim 3, wherein the light diffusing ink layer comprises a first light diffusing ink layer and a second light diffusing ink layer, wherein
    the first light diffusing ink layer and the second light diffusing ink layer are stacked on each other and disposed between the semi-transparent colored ink layer and the film body.

6. The decorative film of claim 3, wherein the light diffusing ink layer comprises a first light diffusing ink layer and a second light diffusing ink layer, wherein
    the first light diffusing ink layer and the second light diffusing ink layer are stacked on each other and disposed at a side of the semi-transparent colored ink layer away from the film body.

7. The decorative film of claim 1, further comprising an adhesive layer that allows light to pass through, wherein the adhesive layer is disposed at a side of the film body and a side of the decorative layer that are close to the light-emitting element, and the adhesive layer adheres to the light-emitting surface of the light-emitting element.

8. The decorative film of claim 7, wherein a material of the adhesive layer comprises printing ink, and the adhesive layer adheres to the light-emitting surface of the light-emitting element through hot pressing; or, the material of the adhesive layer comprises transparent or white optically clear adhesive (OCA), and the adhesive layer adheres to the light-emitting surface of the light-emitting element.

9. A light-emitting module, comprising a light-emitting element and the decorative film of claim 1, the decorative film covering a light-emitting surface of the light-emitting element.

10. The light-emitting module of claim 9, wherein the light-emitting element comprises a circuit board, a plurality of light-emitting chips arranged on the circuit board, and a light-conversion medium layer covering the plurality of light-emitting chips, wherein a side surface of the light-conversion medium layer away from the circuit board is the light-emitting surface of the light-emitting element.

11. The light-emitting module of claim 10, wherein the plurality of light-emitting chips comprise at least one of a light-emitting diode (LED), a mini-LED, or a micro-LED, and a material of the light-conversion medium layer is made of fluorescent adhesive or quantum dot (QD) adhesive.

12. An electronic device, comprising a housing and the light-emitting module of claim 9, the housing comprising a transparent region, and the light-emitting module being disposed inside the housing and visually displayed on the housing through the transparent region.

13. The electronic device of claim 12, further comprising an electronic element disposed inside the housing, wherein the electronic element is visually displayed on the housing through the transparent region, and the light-emitting module is disposed around the electronic element.

* * * * *